No. 768,563. Patented August 23, 1904.

UNITED STATES PATENT OFFICE.

ALPHONSO M. CLOVER, OF ANN ARBOR, MICHIGAN.

ANTISEPTIC COMPOUND.

SPECIFICATION forming part of Letters Patent No. 768,563, dated August 23, 1904.

Application filed December 26, 1903. Serial No. 186,750. (No specimens.)

*To all whom it may concern:*

Be it known that I, ALPHONSO M. CLOVER, a citizen of the United States, residing at Ann Arbor, in the county of Washtenaw and State of Michigan, have invented certain new and useful Improvements in Antiseptic Compounds, of which the following is a specification.

The invention has reference to a new class of compounds which may be derived from compounds of the class of organic peroxid acids by hydrolysis. These compounds possess an intense germicidal action and are non-toxic, so that they may be administered internally with perfect safety. The simplest method of producing compounds of this class is to dissolve a quantity of the corresponding organic peroxid acid in water and to allow the solution to remain until hydrolysis takes place. For example, the specific compound succinic peroxid acid may be dissolved in water, in which it is soluble, to the extent of one to one hundred and twenty at ordinary temperature. The hydrolyzed product is, however, much more soluble, and as a consequence after remaining about twenty minutes the quantity of peroxid acid taken up by the solution is almost double that originally dissolved. The reaction which takes place is, as I understand it, as follows:

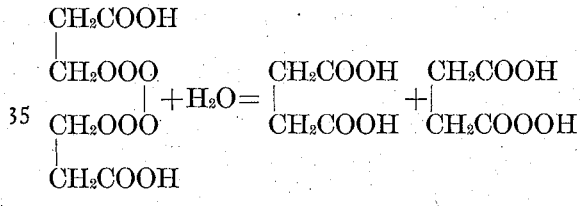

It will be seen that the result of the reaction is to form two compounds, one of which is succinic acid and the other a new body which I shall designate as "succinic monoperacid."

The germicidal action of the succinic monoperacid is many times greater than that of a solution of hydrogen peroxid containing the same amount of active oxygen, the amount of active oxygen being determined by treating the acidulated solution with potassium iodid and titrating with a standard solution of sodium thio sulfate. The substance has not been completely isolated in pure condition, and therefore its physical characteristics are not known. In solution with succinic acid it is characterized by the following properties: It is colorless and odorless, it gradually deteriorates with the formation of hydrogen peroxid, it rapidly liberates iodin from potassium iodid, and it oxidizes a trace of manganous salt to permanganic acid and has an intense germicidal action.

While I have described a simple method of forming succinic monoperacid by hydrolysis of the succinic peroxid acid, the product may also be obtained by other methods.

What I claim as my invention is—

1. An antiseptic compound consisting of a hydrolyzed solution of a peroxid acid which is characterized by the following properties: it is soluble in water; the solution gradually deteriorates with the formation of hydrogen peroxid; it is colorless; substantially odorless, and quickly liberates iodin from potassium iodid.

2. An antiseptic compound consisting of a hydrolyzed solution of succinic peroxid acid which is characterized by the following properties: it is colorless, and is both an acid and a peroxid; it is odorless; it gradually deteriorates with the formation of hydrogen peroxid; it rapidly liberates iodin from potassium iodid, and it oxidizes a trace of manganous salt to permanganic acid, and has an intense germicidal action.

In testimony whereof I affix my signature in presence of two witnesses.

ALPHONSO M. CLOVER.

Witnesses:
H. C. SMITH,
JAS. P. BARRY.